United States Patent
Terranova et al.

(10) Patent No.: US 6,766,949 B2
(45) Date of Patent: Jul. 27, 2004

(54) CASH BACK DURING DISPENSER TRANSACTION

(75) Inventors: Steven N. Terranova, Greensboro, NC (US); John S. McSpadden, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 85 days.

(21) Appl. No.: 10/073,612

(22) Filed: Feb. 11, 2002

(65) Prior Publication Data

US 2002/0070271 A1 Jun. 13, 2002

Related U.S. Application Data

(63) Continuation of application No. 09/280,316, filed on Mar. 29, 1999, now abandoned.

(51) Int. Cl.[7] .............................................. G07B 15/02
(52) U.S. Cl. ...................................... 235/384; 235/375
(58) Field of Search ................................ 235/379, 375, 235/380, 383, 384; 705/26, 27, 13, 42, 43

(56) References Cited

U.S. PATENT DOCUMENTS

| | | | |
|---|---|---|---|
| 4,189,031 A | 2/1980 | Vayda, Jr. | 186/1 C |
| 4,395,626 A | 7/1983 | Barker et al. | 235/381 |
| 5,047,613 A | 9/1991 | Swegen et al. | 235/379 |
| 5,302,811 A | 4/1994 | Fukatsu | 235/381 |
| 5,343,970 A | 9/1994 | Severinsky | 180/65.2 |
| 5,605,182 A | 2/1997 | Oberrecht et al. | 141/94 |
| D386,882 S | 11/1997 | Smith et al. | D99/28 |
| 5,725,124 A | 3/1998 | Bustos et al. | 221/211 |
| 5,797,470 A | 8/1998 | Bohnert et al. | 186/53 |
| 5,816,174 A | 10/1998 | Smith et al. | 109/56 |
| 5,816,443 A | 10/1998 | Bustos | 221/211 |
| 5,826,246 A | 10/1998 | Bator et al. | 705/403 |

(List continued on next page.)

FOREIGN PATENT DOCUMENTS

| | | |
|---|---|---|
| EP | 145034 A1 | 6/1985 |
| GB | 2217073 A | 10/1989 |
| WO | WO 96/28791 | 9/1996 |
| WO | WO 97/20291 | 6/1997 |
| WO | WO 97/21199 | 6/1997 |
| WO | WO 97/24689 | 7/1997 |
| WO | WO 98/45820 | 10/1998 |

OTHER PUBLICATIONS

Convenience Store Decisions, "And Away We Go!", pp. 124–128, Nov. 1998.

(List continued on next page.)

*Primary Examiner*—Karl D. Frech
(74) *Attorney, Agent, or Firm*—Withrow & Terranova, PLLC

(57) ABSTRACT

The present invention provides a system and method allowing customers to conduct a transaction at a fuel dispenser and obtain cash back in association with the transaction at the dispenser or a common terminal in the dispenser forecourt. The system may include a cash dispenser at the fuel dispenser, fueling position, or the central terminal, or, alternatively, a delivery system configured to deliver cash from a central location to the customer at the dispenser, fueling position, or central terminal. During a transaction for purchasing fuel or other products associated with the service station, a customer is provided an opportunity to select an amount of cash to be dispensed or delivered in association with that transaction. Providing a customer the opportunity to receive cash back in association with a dispenser transaction will attract more customers to the station because of convenience as well as provide customers with more disposable cash to spend at the associated quick-serve restaurants and convenience store.

24 Claims, 14 Drawing Sheets

U.S. PATENT DOCUMENTS

| | | | |
|---|---|---|---|
| 5,842,188 A | 11/1998 | Ramsey et al. | 705/416 |
| 5,859,416 A | 1/1999 | Gatto | 235/384 |
| 5,895,457 A | 4/1999 | Kurowski et al. | 705/413 |
| 5,918,764 A | 7/1999 | Bustos et al. | 221/211 |
| 6,003,771 A | 12/1999 | Kusters | 235/383 |
| 6,032,126 A | 2/2000 | Kaehler | 705/16 |
| 6,032,703 A | 3/2000 | Baker et al. | 141/94 |
| 6,032,859 A | 3/2000 | Muehlberger et al. | 235/449 |
| 6,055,521 A | 4/2000 | Ramsey et al. | 705/413 |
| 6,065,568 A | 5/2000 | Harder | 186/53 |
| 6,073,840 A | 6/2000 | Marion | 235/381 |
| 6,089,284 A | 7/2000 | Kaehler et al. | 141/94 |
| 6,092,629 A | 7/2000 | Bohnert et al. | 186/53 |
| 6,098,879 A | 8/2000 | Terranova | 235/384 |
| 6,114,834 A | 9/2000 | Parise | 320/109 |
| 6,116,505 A | 9/2000 | Withrow | 235/381 |
| 6,263,319 B1 | 7/2001 | Leatherman | 705/30 |

OTHER PUBLICATIONS

Armor Safe Technologies, ValiDROP Digital Deposit Validating Safe, Model 1800, no date.

Armor Safe Technologies, The ValiDROP, Model 1861, no date.

Armor Safe Technologies, CacheDROP, Model 1826, no date.

Armor Safe Technologies, ChangeBANK Digital Dispensing Safe, Model 2800, no date.

Armor Safe Technologies, RediCACHE Digital Deposit and Dispensing Safe, Model 3800, no date.

Armor Safe Technologies, POSiCACHE Digital Deposit and Dispensing Safe, Model 4800, no date.

Armor Safe Technologies, The TREASURY Digital Deposit and Dispenisng Safe, Model 6800, no date.

Armor Safe Technologies, The TREASURY thru–wall, no date.

CASH BACK DURING DISPENSER TRANSACTION

This is a continuation of Application Ser. No. 09/280,316, filed Mar. 29, 1999 now abandoned.

BACKGROUND OF THE INVENTION

The present invention relates in general to fuel dispensers and fuel dispensing environments, and, in particular, to a dispenser and dispensing system capable of conducting financial transactions through a financial network.

Historically, a fuel dispenser's only function was to dispense fuel from an underground storage tank to an automobile. As technology evolved, fuel dispensers were equipped with credit and debit card readers, and, to a limited extent, cash acceptors. These developments facilitated easy payment and dramatically increased convenience to customers. The increased convenience to the customer increased the number of transactions for each dispenser at a fueling station, but actually decreased the volume of sales in convenience stores associated with the fueling station. "Pay at the pump" customers are completing their transaction at the dispenser without going into the convenience store and purchasing goods and services that provide higher profit margins than fuel.

In an effort to attract customers into the convenience store, today's fuel dispensers provide various levels of merchandising and advertising for marketing specific products and services, most of which are paid for at the dispenser using the card reader or cash acceptor. A further advancement in dispenser technology provides wireless communications between a dispenser or associated communications system and a remote communication unit or transponder carried by a person or mounted to a vehicle. These wireless communications systems typically interrogate the transponder to receive identification and account information sufficient to facilitate a transaction.

As indicated above, items purchased in a convenience store or associated quick-serve restaurant are much more profitable than the gasoline dispensed in the forecourt of a gas station. Many of the "pay at the pump" customers are trying to maximize convenience and often carry little or no cash. Many of these customers avoid conducting a card transaction at the dispenser and then going into the convenience store to conduct another card transaction for additional products. If customers have sufficient disposable cash, they are more likely to conduct a quick cash transaction in the convenience store to purchase products. Unfortunately, most "pay at the pump" customers do not have excess cash to purchase products. Furthermore, many times these customers would like quick access to cash and would find obtaining cash at a service station convenient.

Although many convenience stores now have automated teller machines (ATM's), these machines typically charge both the station operator and the customer service charges or fees for obtaining cash. A substantial portion of these fees could be avoided if customers were given the opportunity to receive cash back in association with a transaction substantially carried out at the dispenser in association with a fueling or other ordering transaction. Thus, there is a need to provide a customer with cash in association with a fueling or other ordering transaction at a dispenser to increase available cash to the customer.

SUMMARY OF THE INVENTION

The present invention addresses these needs by providing a system and method allowing customers to conduct a transaction at a fuel dispenser and obtain cash back in association with the transaction at the dispenser or a common terminal in the dispenser forecourt. The system may include a cash dispenser at the fuel dispenser, fueling position, or the central terminal, or, alternatively, a delivery system configured to deliver cash from a central location to the customer at the dispenser, fueling position, or central terminal. During a transaction for purchasing fuel or other products associated with the service station, a customer is provided an opportunity to select an amount of cash to be dispensed or delivered in association with that transaction. Providing a customer the opportunity to receive cash back in association with a dispenser transaction will attract more customers to the station because of convenience as well as provide customers with more disposable cash to spend at the associated quick-serve restaurants and convenience store.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
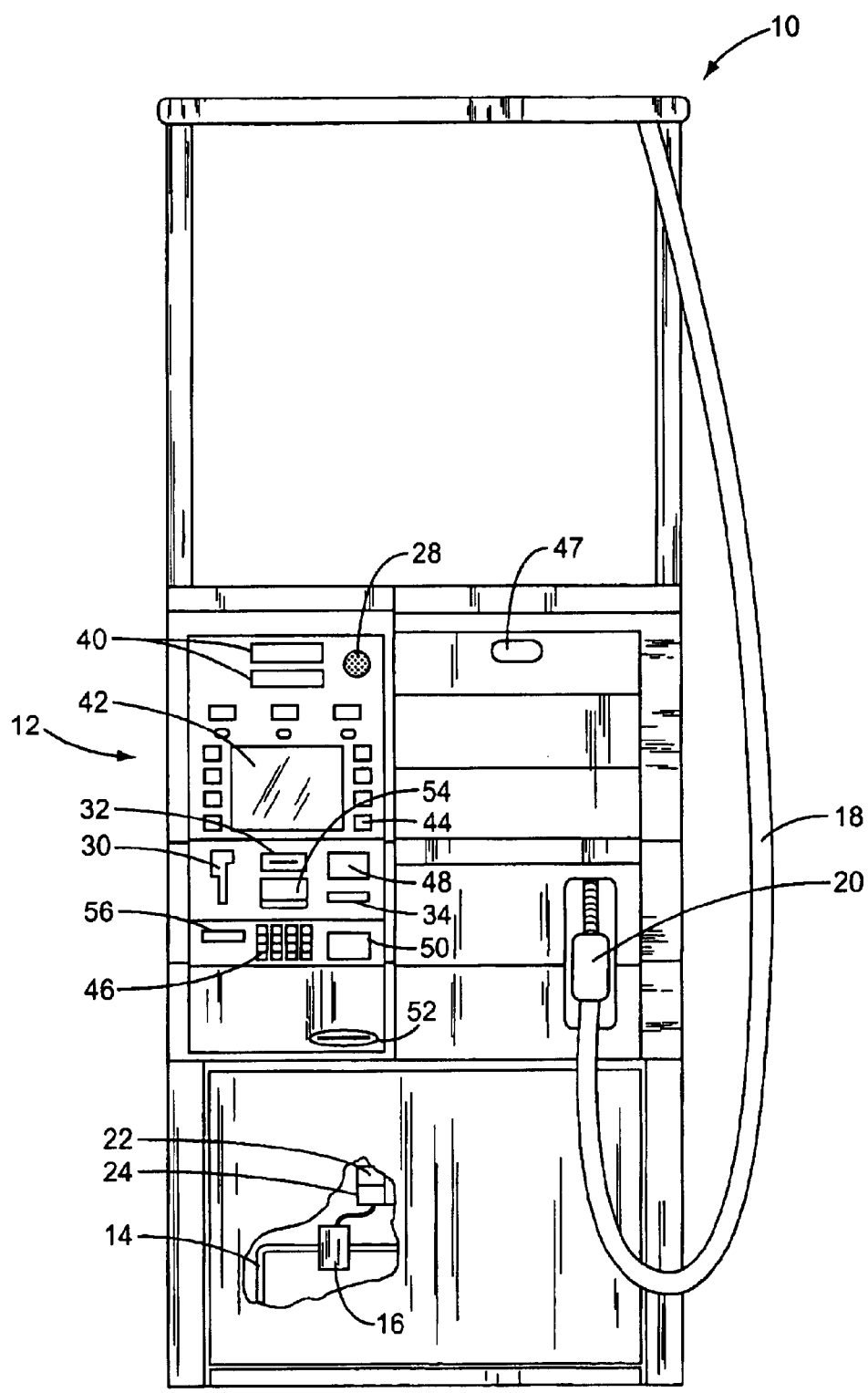
FIG. 1 is a depiction of a fuel dispenser equipped with an interface according to the present invention.

In the following description, like reference characters designate like or corresponding parts throughout the several views. The illustrations are for the purpose of describing preferred embodiments of the invention and are not intended to limit the invention thereto. Given the nature of the present application, an overview of the fueling environment is discussed followed by a detailed description of the various functional aspects of the invention.

As seen in FIG. 1, a fuel dispenser 10 is shown constructed according to the present invention with a user interface 12 and a fuel delivery system. The delivery system provides a fuel delivery path from an underground storage tank to a vehicle. The delivery path includes a fuel delivery line 14 having a flow meter 16. The fuel delivery line 14 communicates with a fuel delivery hose 18, which extends outside the dispenser and has a delivery nozzle 20. The delivery nozzle 20 provides manual control of fuel delivery to the vehicle.

The dispenser 10 also includes a control system 22 having one or more controllers and associated memory 24. The control system 22 operates to control the dispenser interface 12 and the fuel delivery system. The dispenser interface will include various combinations of subsystems to facilitate customer interaction with the dispenser and communication between the dispenser and local and remote systems. The dispenser may also be equipped with an audio system with one or more speakers 28 in order to provide various beeps, tones and audible messages to a customer. These messages may include warnings, instructions, and advertising.

Figure 2:
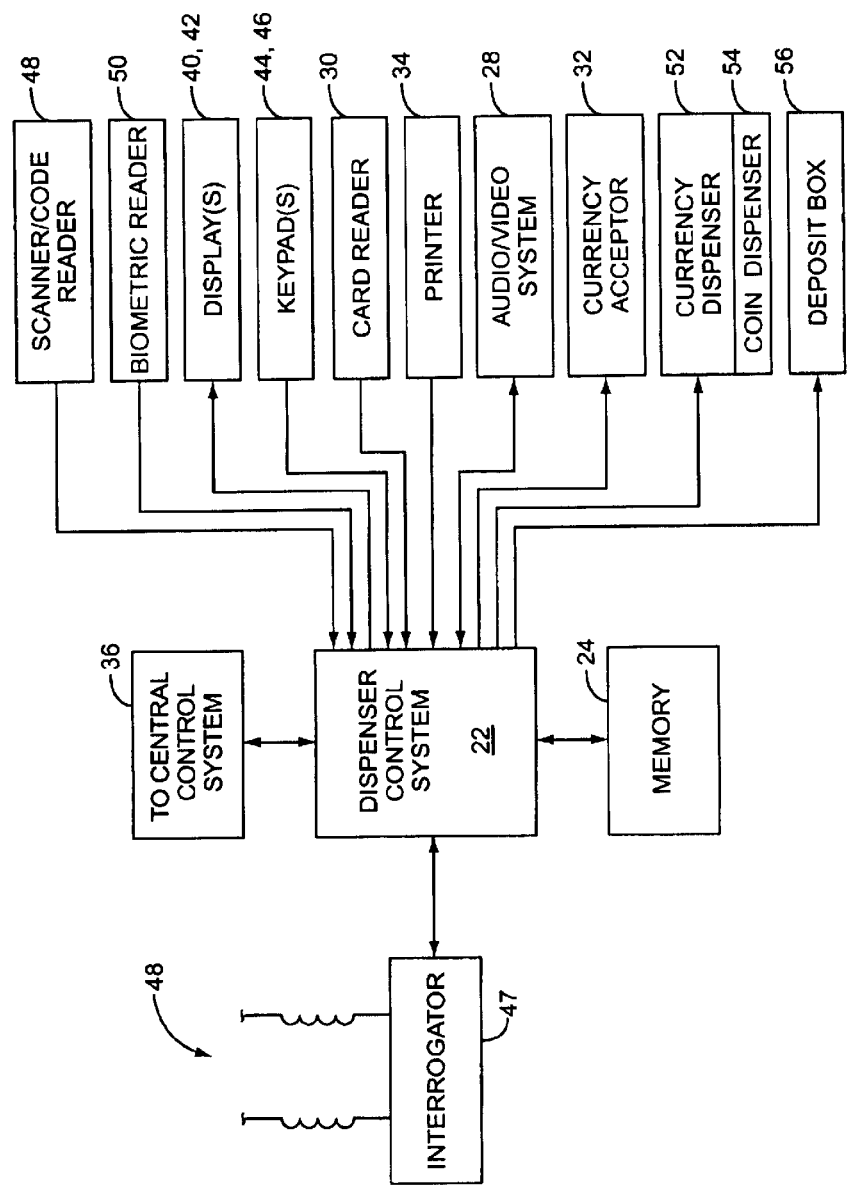
FIG. 2 is a block schematic of the fuel dispenser of FIG. 1.

In one embodiment of the present invention, the dispenser 10 is equipped with a card reader 30, cash acceptor 32, and printer 34. With these options, the dispenser control system 22 may read data from the magnetic strip of a card inserted into the card reader 30 as well as account for cash received from a customer during a transaction. As shown in FIG. 2, such financial information is typically communicated to a central control system 36, located in another part of the fueling environment. The central control system may be the G-SITE controller sold by Gilbarco Inc., 7300 West Friendly Avenue, Greensboro, N.C. The central control system 36 generally communicates with a remote network 48, such as an account verification authority, to ascertain whether a transaction proposed to be charged or debited from an account associated with the card inserted in the card reader 30 is authorized. For transactions receiving cash through the cash acceptor 32, an amount of cash received by the dispenser is forwarded to the central control system 36 for accounting. A receipt of any transaction occurring at the dispenser is printable using a printer 34.

The dispenser 10 may include one or more displays, such as an alphanumeric display 40 and a high resolution graphics display 42. The graphics display 42 is preferably a liquid crystal display or cathode-ray tube configured to display graphics, video, or a combination thereof. Either of these displays may be associated with one or more keypads, such as soft keys 44 or the hard keypad 46. Either of these keypads may be integrated with one of the displays to provide a touch-activated interface.

The fueling environment, and preferably each dispenser, may be equipped with wireless communication electronics to provide uni- or bi-directional communications between a customer or vehicle carrying a corresponding remote communications device. The communication electronics will typically include a transmitter for transmitting signals to the remote communication device and a receiver for receiving signals emanating from the remote communication device. Likewise, the remote communication device may also include a receiver and transmitter. The transmitter and receiver of the remote communication device may separately receive and separately transmit signals in cooperation with an associated control system, or may be configured so that the transmitter actually modifies the signal received from the communication electronics in the fueling environment.

For the sake of conciseness and readability, the term "transponder" is used herein to describe any type of remote communication device capable of communicating with the communication electronics of the fueling environment. Similarly, the communication electronics in or associated with the dispenser 10 is referred to as an "interrogator" 47. Typically, the transponder is used to quickly and efficiently transmit account and identification information to a dispenser to facilitate a transaction taking place at the dispenser. A unique and optional aspect of the present invention is to use the transponder to help correlate and identify a customer starting a transaction at one point in the fueling environment and completing the transaction at another point, wherein the transponder is interrogated at each point to help identify a user with a select transaction or operation.

The dispenser 10 may also be equipped with a scanner or code reader 48, such as a bar code reader, to receive additional information from a customer. The information may come from a printout received from another location, or a code on an associated card or like medium. The dispenser 10 may also include a biometric reader 50 for reading fingerprints, retinal information, or like biometric indicia to help identify a user and facilitate secure transactions.

Of particular interest with respect to the first embodiment, the dispenser 10 may include a currency dispenser 52 and/or a coin dispenser 54 configured to dispense paper currency or coins in response to signals from the dispenser control system 22. In this embodiment of the present invention, the dispenser control system and currency dispenser 52 cooperate to dispense a requested amount of cash back to the customer at the end of a transaction taking place or initiated at the dispenser.

In certain embodiments, it is preferable to equip the dispenser 10 with a currency dispenser 52 for dispensing paper currency and not to equip the dispenser 10 with a coin dispenser 54 to minimize cost and complexity of the system. Other embodiments may require the addition of a coin dispenser 54. Operation of the system with respect to providing cash back during a dispenser transaction is discussed in detail below.

The dispenser of this embodiment may include a deposit box 56 for receiving various types of financial documents and cash for deposit with the service station or associated financial institution. Each dispenser is configured to facilitate various financial transactions, including dispensing cash back to a customer in association with a fueling transaction, without external delivery systems configured to physically transfer documents, including cash or coins, to the dispenser from a central location.

Figure 3:
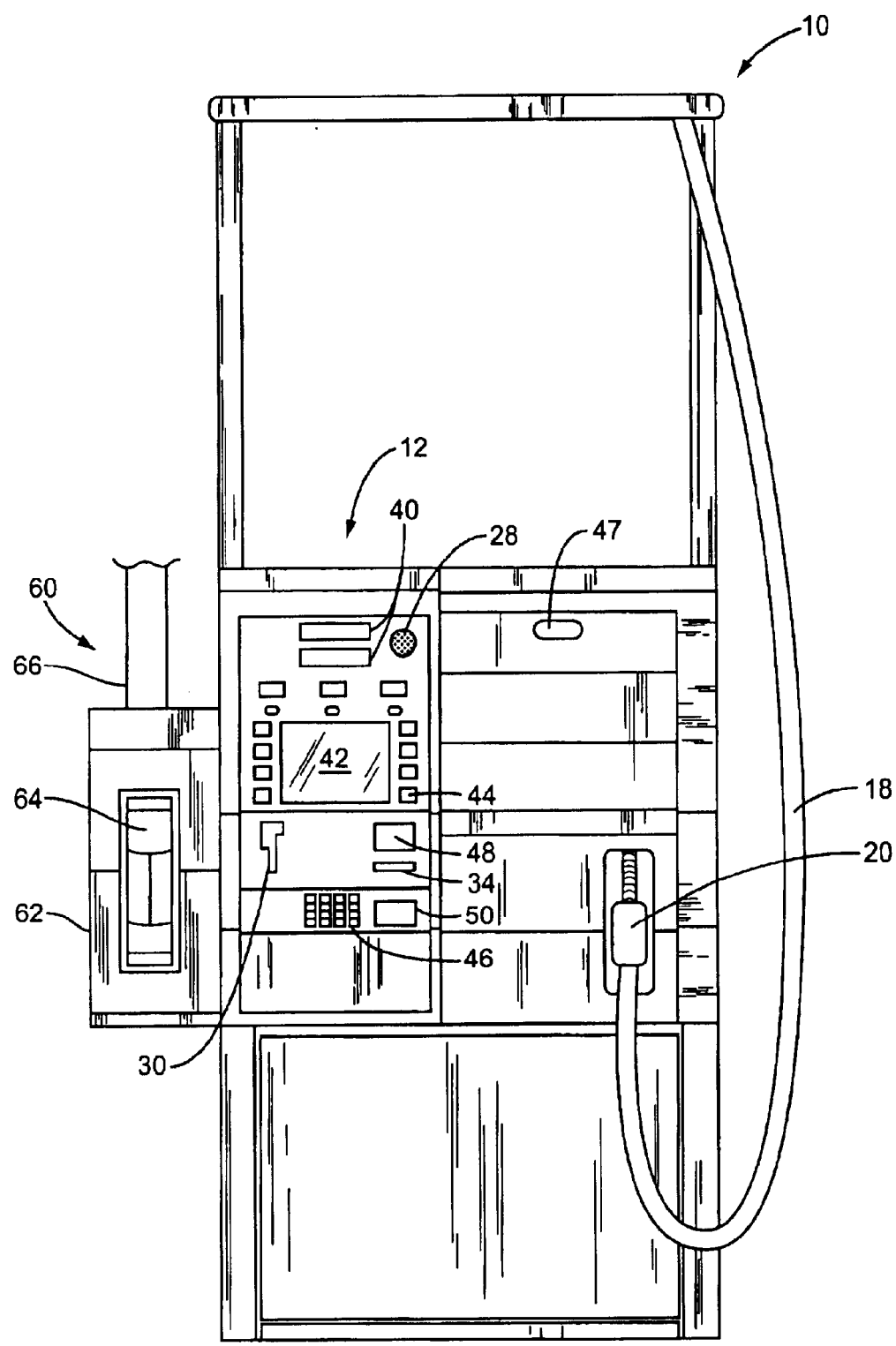
FIG. 3 is a depiction of a fuel dispenser having an associated delivery terminal.
Figure 4:
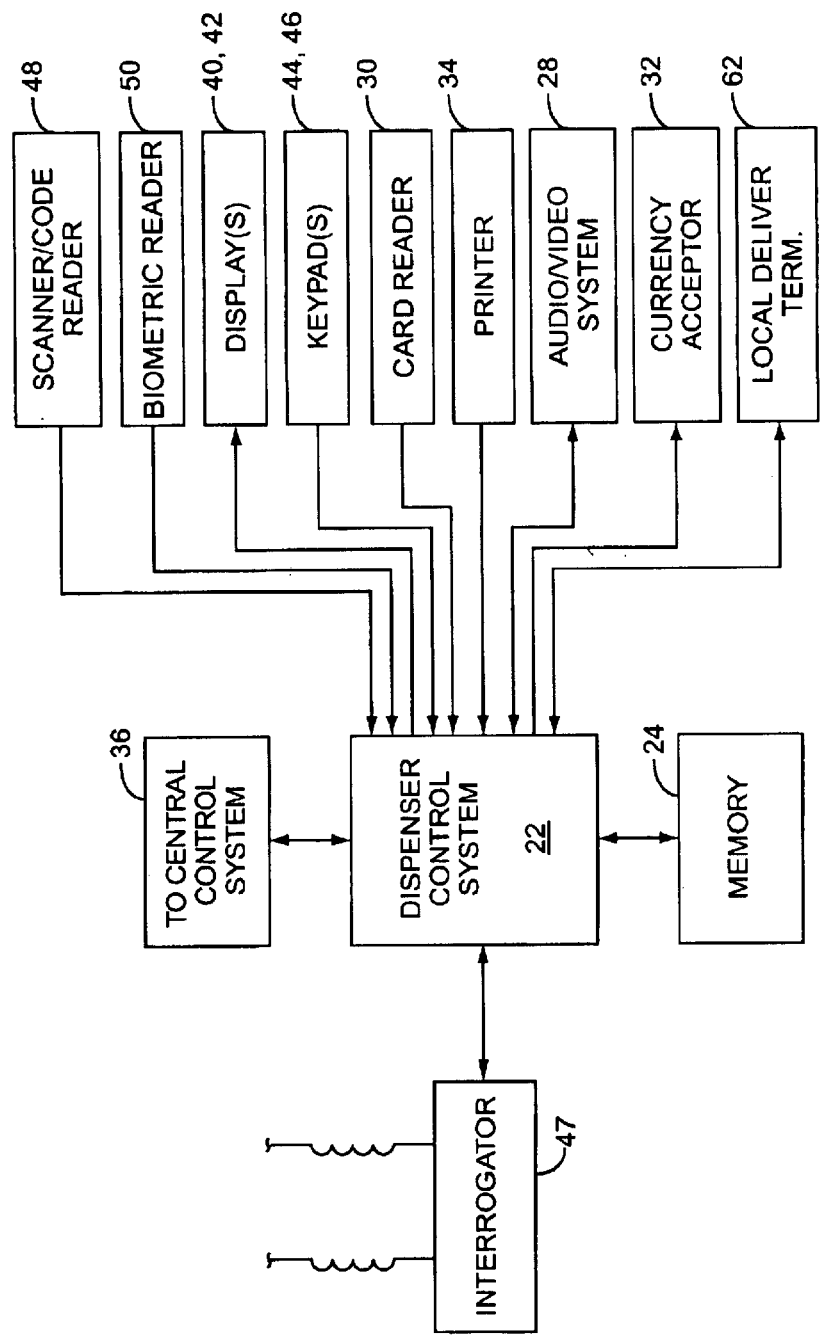
FIG. 4 is a block schematic of the fuel dispenser of FIG. 3.
Figure 5:
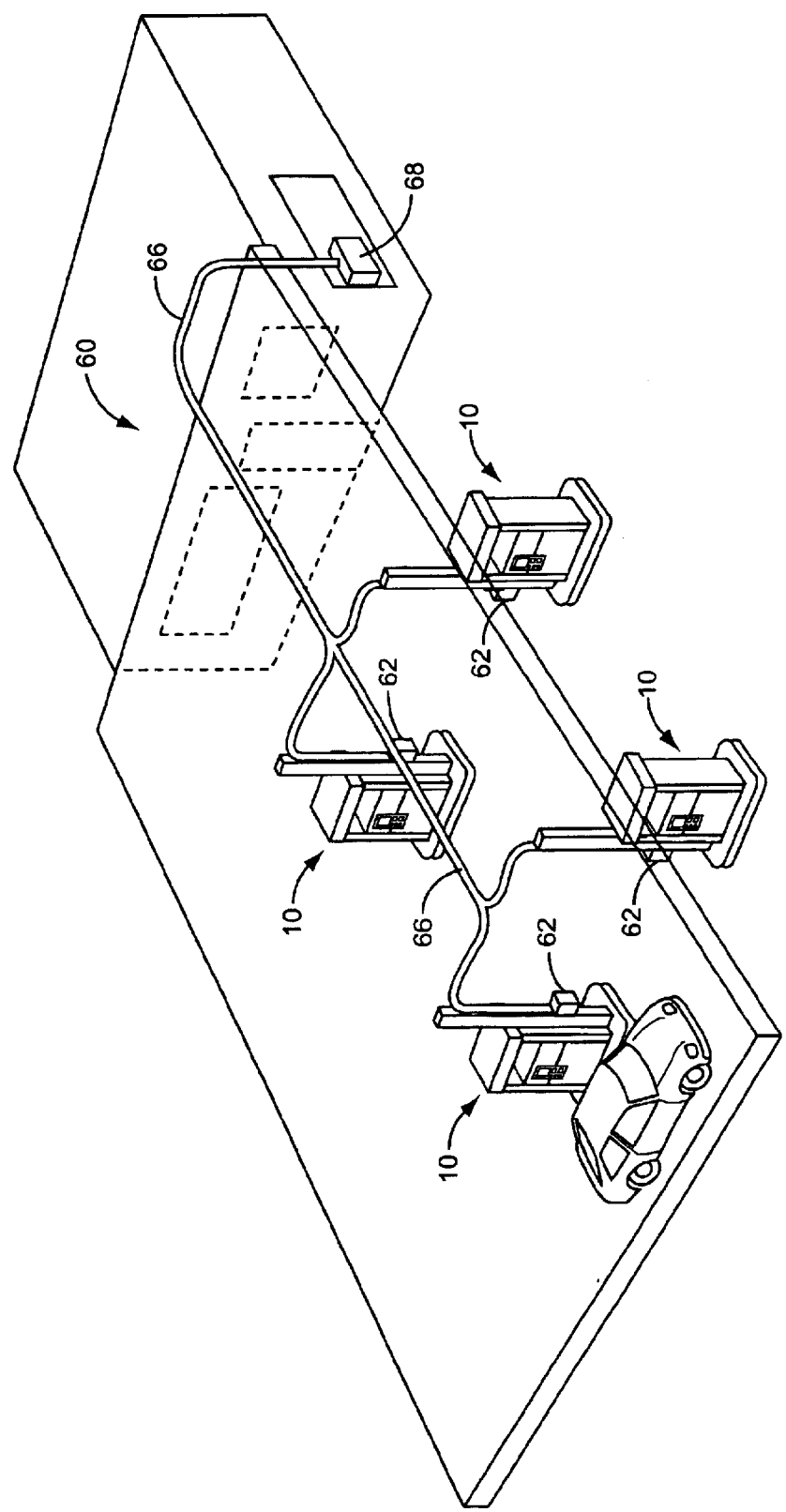
FIG. 5 is a perspective view of a fueling environment configured with a pneumatic delivery system capable of delivering cash from a central location to each of a plurality of fuel dispensers.

In a second embodiment of the invention, as depicted in FIGS. 3–5, each dispenser in the service station forecourt is associated with a mechanical, and preferably pneumatic, delivery system 60. The delivery system 60 is configured to physically transfer documents and products, including cash, from a local delivery terminal 62 associated with each dispenser 10 to a central delivery terminal 68 via a delivery transport 64. The transport 64 includes delivery tubing 66 between the local and central delivery terminals 62, 68.

In other respects, the fuel dispenser 10 is equipped similar to the first embodiment discussed above, with the exception that cash is not dispensed from the system within or associated with the dispenser, but from the delivery system 60. It is important to note that the local delivery terminal 62 of the second embodiment and the cash dispenser of the first embodiment may be integrated within the dispenser, attached to the dispenser, or configured as a stand-alone system substantially adjacent to the dispenser. Furthermore, these systems may be associated with a single dispenser or each fueling position of a dispenser. For the sake of conciseness and readability, only the integrated cash dispenser embodiment and delivery embodiment having an attached local delivery terminal 62 are discussed in detail.

Figure 6:
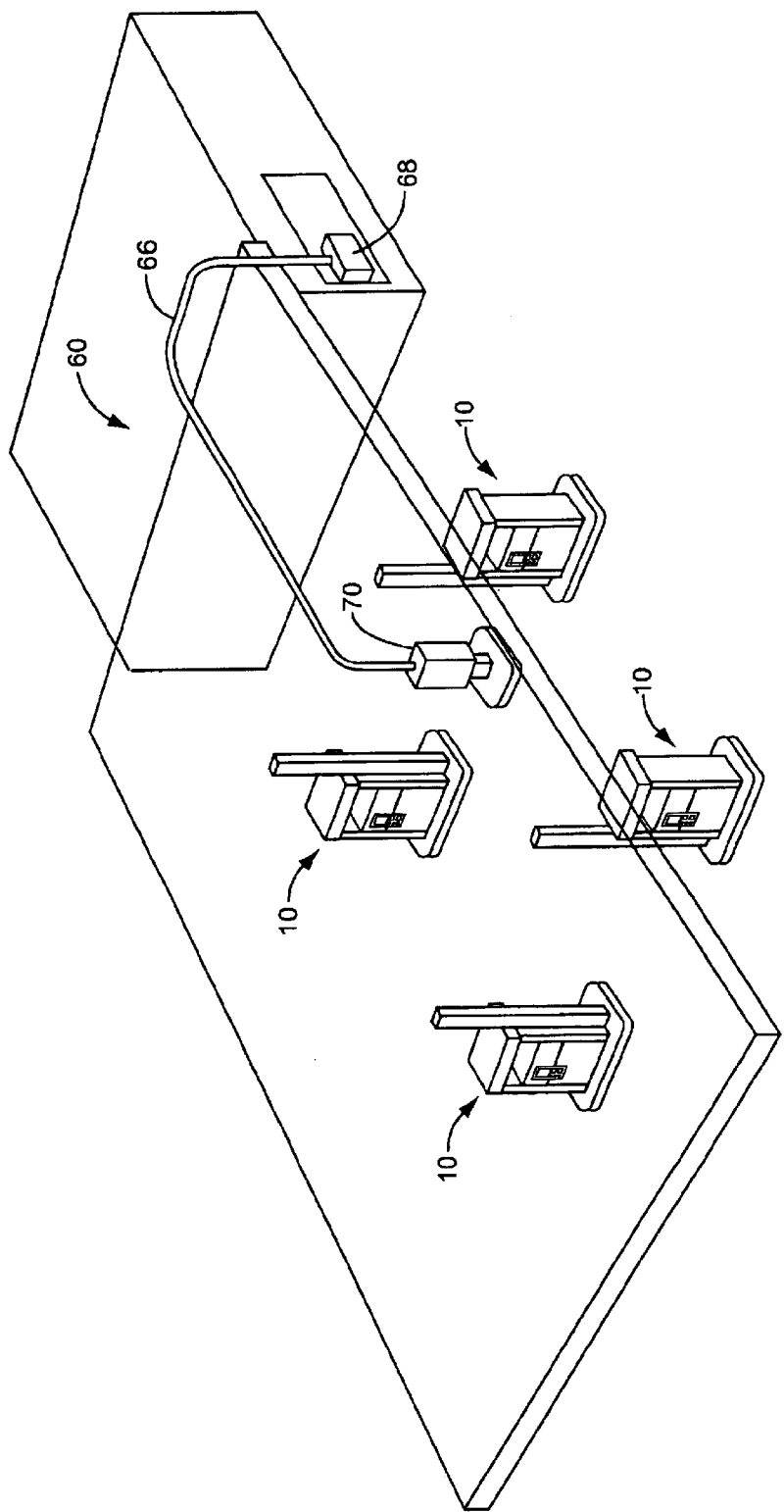
FIG. 6 is a perspective view of a fueling environment having a pneumatic delivery system configured to deliver cash to a common location in the forecourt of the fueling environment.

A third embodiment is shown in FIG. 6 wherein a delivery system 60 cooperates between a central delivery terminal 68 and a common delivery terminal 70 located in the forecourt of the service station. Instead of having immediate access to the delivery system at each dispenser, the common delivery terminal 70 is provided which is accessible by customers conducting transactions at any dispenser. As such, a customer at any of the dispensers requesting cash back may make the request at any of the dispensers and actually receive the cash at the common delivery terminal 70.

Figure 7:
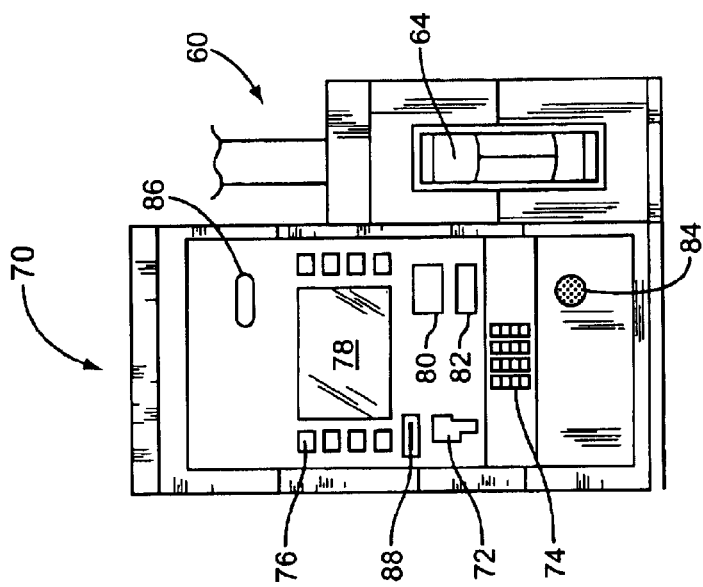
FIG. 7 is a depiction of a common terminal associated with a delivery terminal of a pneumatic delivery system.

FIG. 7 depicts one embodiment of a common delivery terminal 70 having a card reader 72, hard keypad 74, soft keypad 76, and display 78. The common delivery terminal 70 may also include a scanner or code reader 80, biometric reader 82, audio system 84, interrogator 86, and printer 88. These systems operate in similar fashion to corresponding systems located in the dispenser as discussed with the above embodiments.

Figure 8:
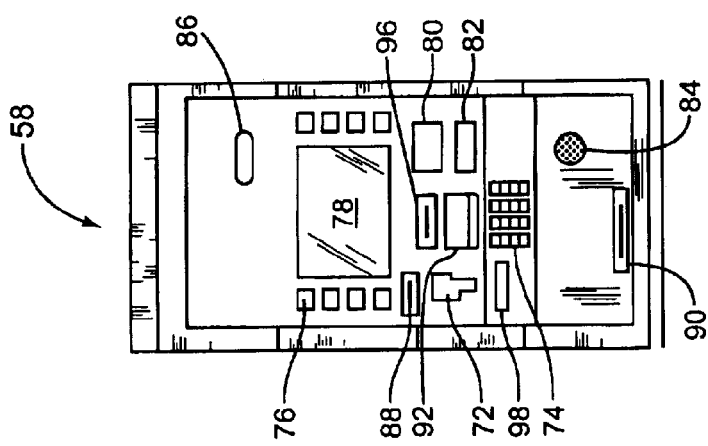
FIG. 8 is a depiction of a common terminal having a coin and currency dispenser.

In yet another embodiment shown in FIG. 8, a common dispensing terminal 58 may be located in a common location in the forecourt, in a fashion similar to that described with the common delivery terminal 70. The difference between the common delivery terminal 70 and the common dispensing terminal 58 shown in FIG. 8 is that a delivery system is not required, and the terminal is configured to dispense cash from internal reserves. Preferably, the common dispensing terminal 58 may include a hard keypad 74, soft keypad 76, display 78, and printer 88. As noted with the common delivery terminal 70, a scanner or code reader 80, biometric reader 82, audio system 84, and interrogator 86 may also be provided.

Preferably, the common dispensing terminal 58 will include a currency dispenser 90 for delivering cash back to a customer in association with a transaction. An optional coin dispenser 92 is also available. To make additional purchasing easy, an optional currency acceptor 96 and card reader 72 is provided. In an effort to facilitate additional financial transactions, a common deposit box 98 is provided to receive various documents associated with any type of financial transaction occurring at the common dispensing terminal 58.

With the above described embodiments and variations thereof based on the teachings within, customers conducting transactions at a dispenser will be able to receive cash back in association with the transaction in the forecourt without having to enter the station or conduct a second financial operation.

Figure 15:
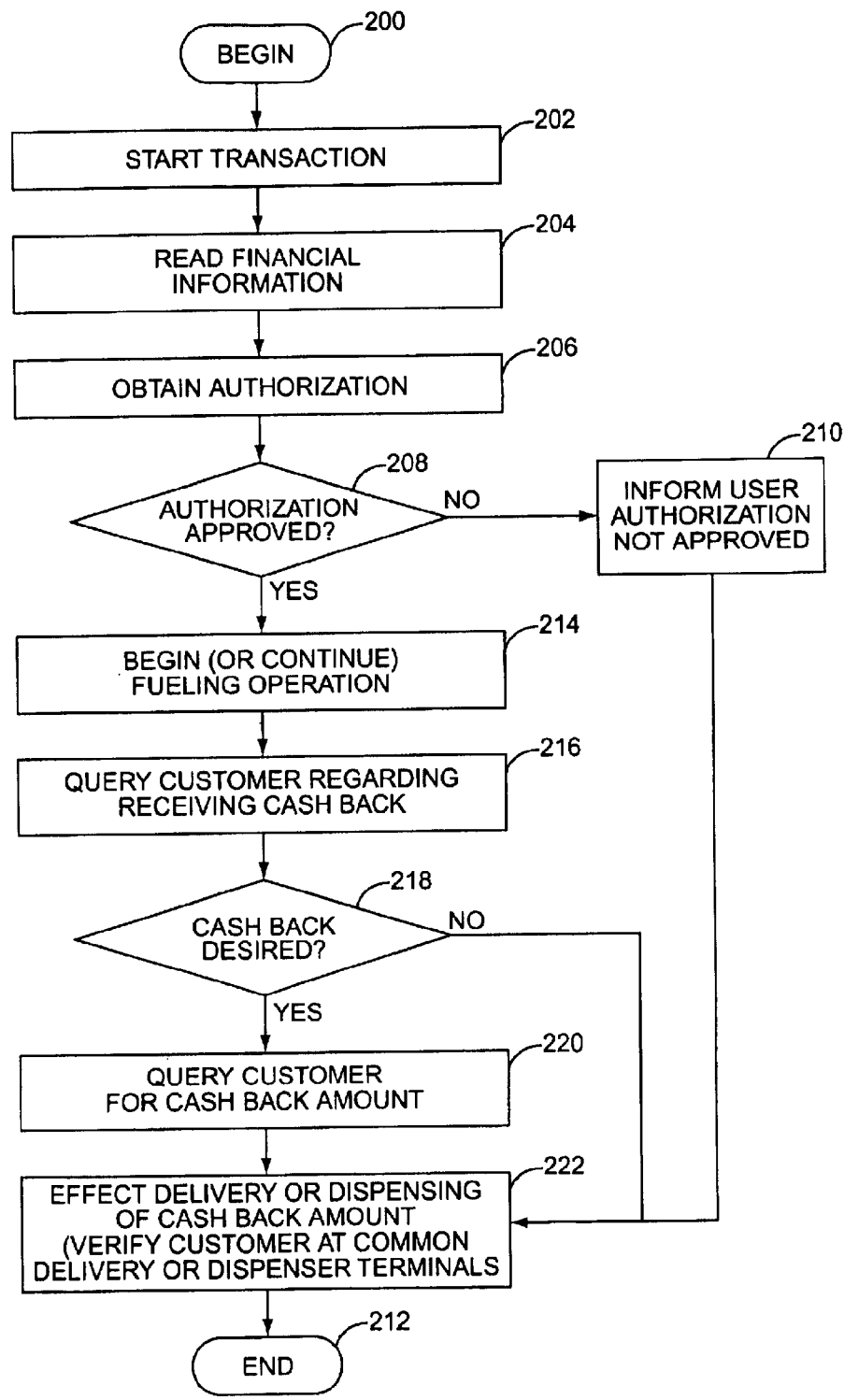
FIG. 15 is a flow chart outlining the basic operation of requesting cash back at a dispenser and receiving the cash at the dispenser, an associated delivery terminal, or a common dispenser or delivery terminal.

As shown in FIG. 15, basic flow of operation for the present invention is provided. A typical process will begin (block 200) where a fueling transaction is started (block 202). A customer's financial information is read from any type of readable media, such as a magnetic card or transponder (block 204). The fuel dispenser and central control system will cooperate to obtain authorization based on the financial information (block 206). If authorization is not obtained (block 208), the customer is so informed (block 210), and the process ends (block 212).

If the account information for the customer is authorized, the fueling operation will begin or continue (block 214). Certain fueling systems allow a fueling operation to begin while authorization is being obtained while other fueling systems require authorization before starting the fuel delivery. Those skilled in the art will recognize the many variations for obtaining an authorization for a transaction as well as obtaining additional cash for the customer. Generally, once authorization is obtained, the dispenser will query the customer as to whether or not an amount of cash back is desired (block 216). If additional cash is not desired (block 218), the process ends (block 212). If the customer elects to receive cash in association with the transaction (block 218), the dispenser will query the customer for the amount of cash desired (block 220). The dispenser, control system, and any other local or remote device will cooperate to effect delivery or dispensing of the cash (block 222). For the dispensing or delivery systems having a common terminal, the customer is preferably verified before cash is dispensed, delivered, or at least before the customer is provided public access.

In similar fashion, various financial transactions are made possible at the dispenser or a common terminal 58, 70 without requiring the customer to directly interface with an automated teller machine (ATM). These functions may include checking account status, making deposits, or withdrawing cash from an account associated with a customer's card, transponder, or other portable, readable media carrying financial information.

Detailed Operation of the Above Embodiments

Figure 9:
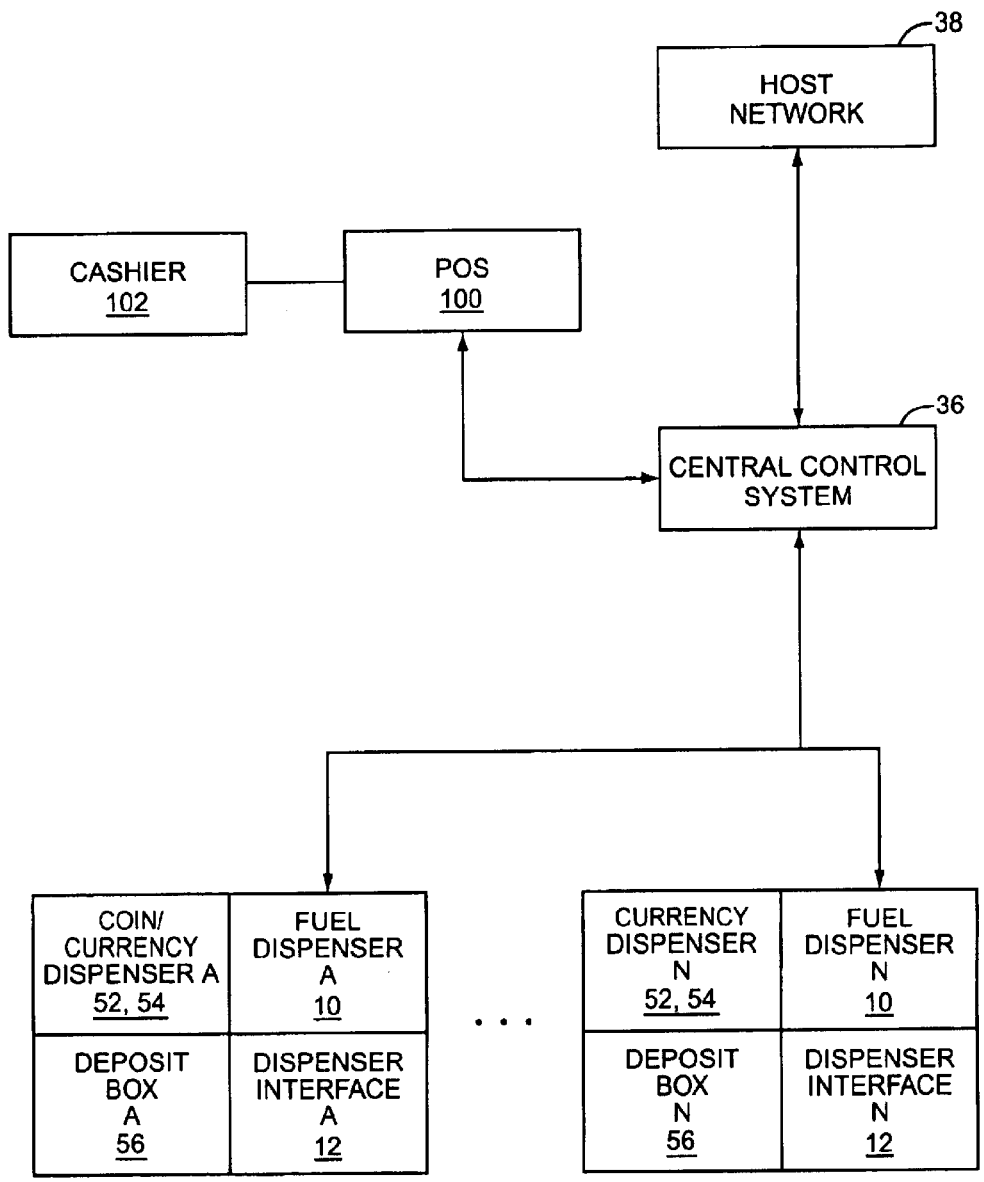
FIG. 9 is a block schematic of a system constructed according to the present invention having a cash dispenser at each fuel dispenser.

Referring now to FIG. 9, a block schematic of the first embodiment is shown wherein fuel dispensers 10 are equipped with currency and/or coin dispensers 52, 54 for dispensing cash to a customer. Each of the dispensers are preferably in communication with a central control system 36, which is in further communication with a host network 38. The host network 38 may be an account verification authority, financial institution, or other network or institution effecting or necessary for customer transactions. The central control system 36 may also be associated with a point-of-sale (POS) terminal 100 located in the convenience store or associated quick-serve restaurant. The POS terminal is usually operated by a cashier 102.

During operation, a customer typically interfaces with the fuel dispenser 10 via the dispenser interface 12 to conduct a transaction to purchase fuel or order goods or services from the convenience store, quick-serve restaurant, or associated car wash. In association with the transaction, the fuel dispenser 10 is configured to query the customer as to whether he/she would like cash back. During initiation of the fueling transaction, transactions to be credited to or debited from an associated account are handled by the fuel dispenser 11 transferring the information to the central control system 36, which in turn sends the financial information along with transactional information to the host network 38 for authorization and ultimate accounting. A request for cash back may take place during this initial authentication process or may be accounted for at or near the end of the primary transaction. For example, the fuel dispenser 10 and central control system 36 may cooperate to add to the transaction total the amount of cash requested back by the customer, and send the total to the host network 38 for accounting. As such, the host network never actually realizes that cash is being provided to the customer in addition to accounting for the transaction. Alternatively, the amount of cash back may be accounted for and authorized separately by the central control system 36 and host network 38. Those of ordinary skill in the art will recognize numerous methods of accounting for the cash requested back by the customer. In order to provide the customer with cash, the fuel dispensers 10 in FIG. 9 will cooperate with the central control system 36 to signal the currency and/or coin dispensers 52, 54 to dispense the proper amount of cash back to the customer.

Figure 10:
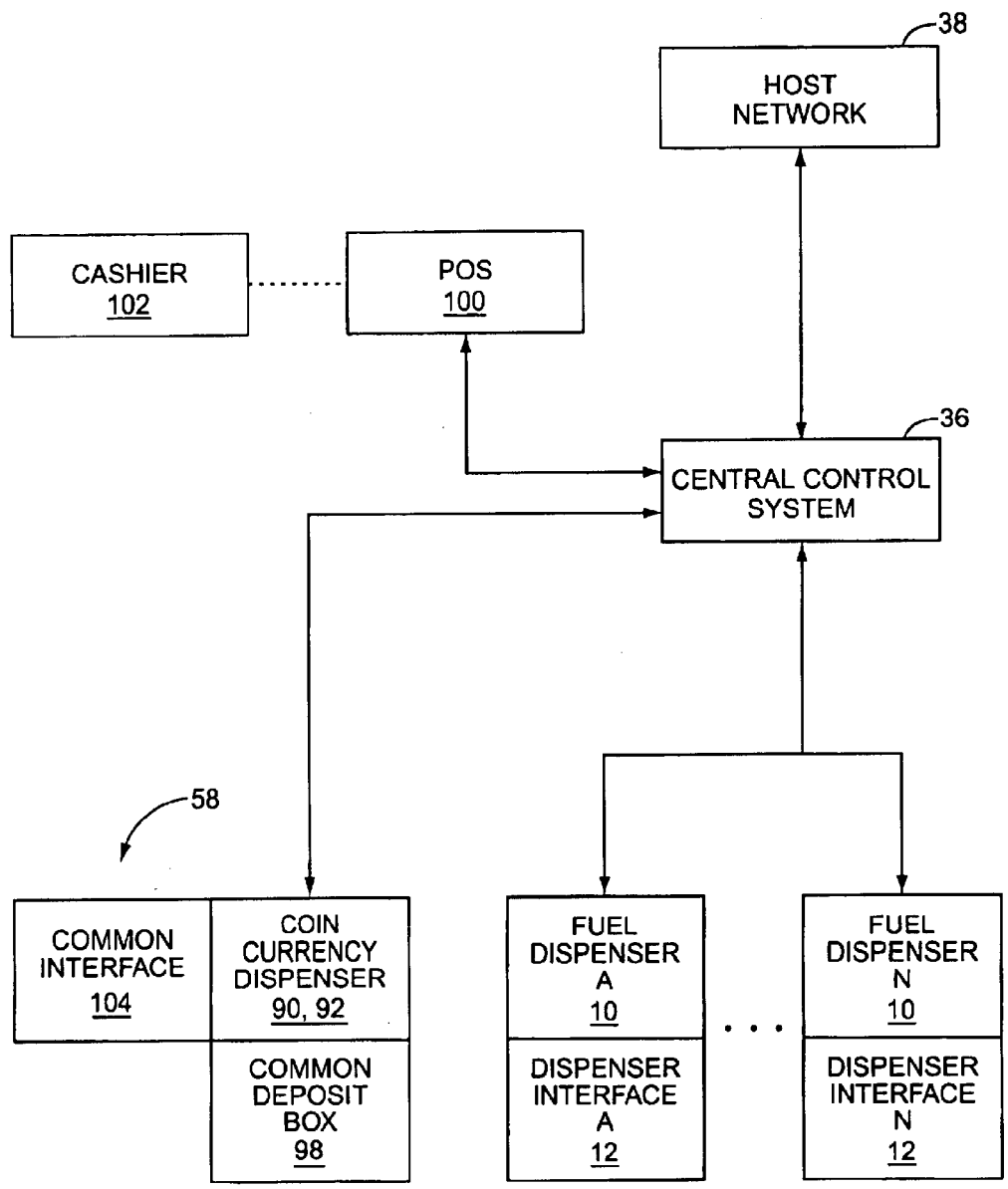
FIG. 10 is a block schematic of a system constructed according to the present invention having a common currency dispenser located in the forecourt.

In the embodiment shown in FIG. 10, the fuel dispensers 10 are not equipped to dispense cash, but are associated with the common dispensing terminal 58. In order for a customer to receive cash back, the initial transaction and request for additional cash is made at the fuel dispenser as described in the embodiment shown in FIG. 9. An additional step is required with the embodiment of FIG. 10 wherein the customer must go to the common dispensing terminal to receive the cash back. In order to make sure the proper customer receives the cash requested, additional verification of the customer associated with a select amount of cash back must take place at the common dispensing terminal 58. Such verification may require entering a personal identification number (PIN), code, reinserting the magnetic card, or simply having the common dispensing terminal 58 interrogate a transponder associated with the customer using the interrogator 86.

As those skilled in the art will recognize, there are many ways to verify a customer at the common dispensing terminal 58 and associate that customer with the proper amount of cash to dispense. In addition to the above-mentioned techniques, the fuel dispenser 10 may print a code or number at the fuel dispenser 10 which is subsequently entered or scanned by the common dispensing terminal 58 to match the customer with the selected amount of cash back. Upon verification, the central control system will cooperate with the common dispensing terminal 58 to dispense the proper amount of cash using the currency or coin dispenser 90, 92.

With either of the embodiments shown in FIG. 9 or 10, other financial transactions may be effected at the fuel dispenser and/or common dispensing terminal 58. Preferably, deposits would be made at the deposit box 98 of the common dispensing terminal 58. Checking on account status or transferring funds from one account to another in a fashion similar to that done at an ATM may take place at the fuel dispenser during the fueling transaction or separately at the common dispensing terminal. Although the common dispensing terminal may be directly associated with the various fuel dispensers in the forecourt, it is preferable to have the central control system 36 serve as the control center for each of the fuel dispensers as well as any common dispensing terminals 58.

Figure 11:
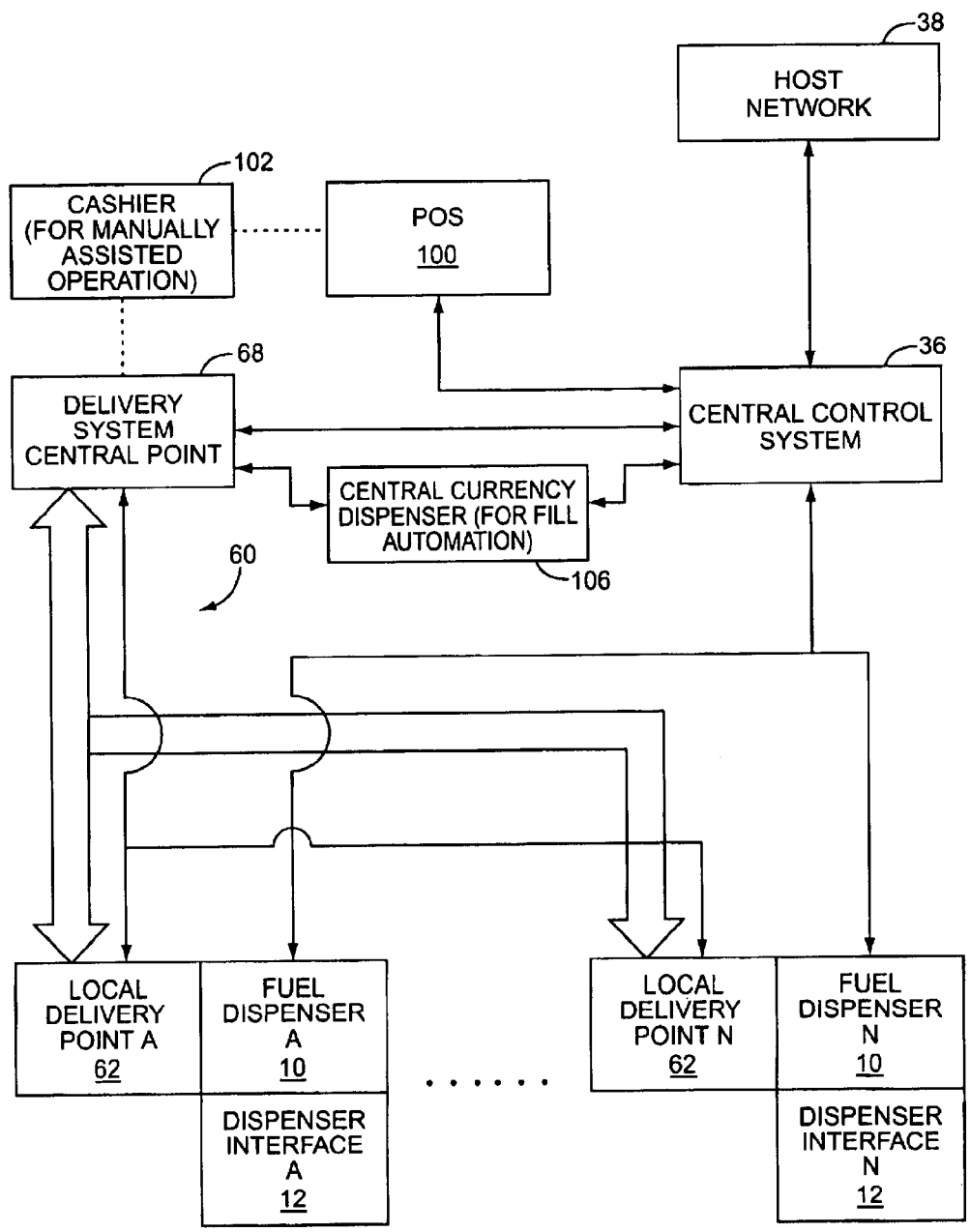
FIG. 11 is a block schematic of a system constructed according to the present invention having a delivery system configured to deliver cash to each fuel dispenser.

Turning now to FIG. 11, a block diagram of a pneumatic delivery system is shown having local delivery points 62 associated with each of the fuel dispensers 10 in the forecourt. Accounting for transactions, requesting cash back, and conducting automated teller-type functions at the dispenser are handled via the central control system 36 in association with one or more host networks 38. The central control system 36 is usually in communication with and operates to control the delivery system 60 based on customer requests and transactions at each fuel dispenser 10. Preferably, cash or other products for delivery to a local delivery terminal 62 associated with any of the fuel dispensers 10 are loaded manually at the central delivery terminal 68 by a cashier 102 or other site personnel, or automatically from a central currency dispenser 106. If a central currency dispenser 106 is used, it is also preferably controlled by the central control system 36 such that cash requested by the customer is automatically loaded into the delivery system 60 at the central delivery point 68 by the central currency dispenser 106. After the currency is loaded at the central delivery terminal 68, it is transported to the select local delivery point 62.

In this embodiment, deposits may be made at the local delivery point and sent to the central delivery point for deposit. Financial transactions, such as transferring money from one account to another that do not require delivery or deposit, may take place at the fuel dispenser. Additional information relating to pneumatic delivery systems may be found in the following references:

U.S. Pat. No. 3,365,146 (Freeman) Issued Jan. 23, 1968;
U.S. Pat. No. 3,877,241 (Wade) Issued Apr. 15, 1975;
U.S. Pat. No. 3,951,461 (De Feudis) Issued Apr. 20, 1976;
U.S. Pat. No. 4,189,031 (Vayda, Jr.) Issued Feb. 19, 1980;
U.S. Pat. No. 4,284,370 (Danler et al.) Issued Aug. 18, 1981;
U.S. Pat. No. 4,930,941 (Willey et al.) Issued Jun. 5, 1990;
U.S. Pat. No. 5,092,714 (Porter et al.) Issued Mar. 3, 1992;
U.S. Pat. No. 5,354,152 (Reinhardt et al.) Issued Oct. 11, 1994;
U.S. Pat. No. 5,562,367 (Scott) Issued Oct. 8, 1996;
U.S. Pat. No. 5,636,710 (Ables etal.) Issued Jun. 10, 1997; and
U.S. Pat. No. 5,725,124 (Bustos et al.) Issued Mar. 10, 1998.

These patents are incorporated herein by reference.

Figure 12:
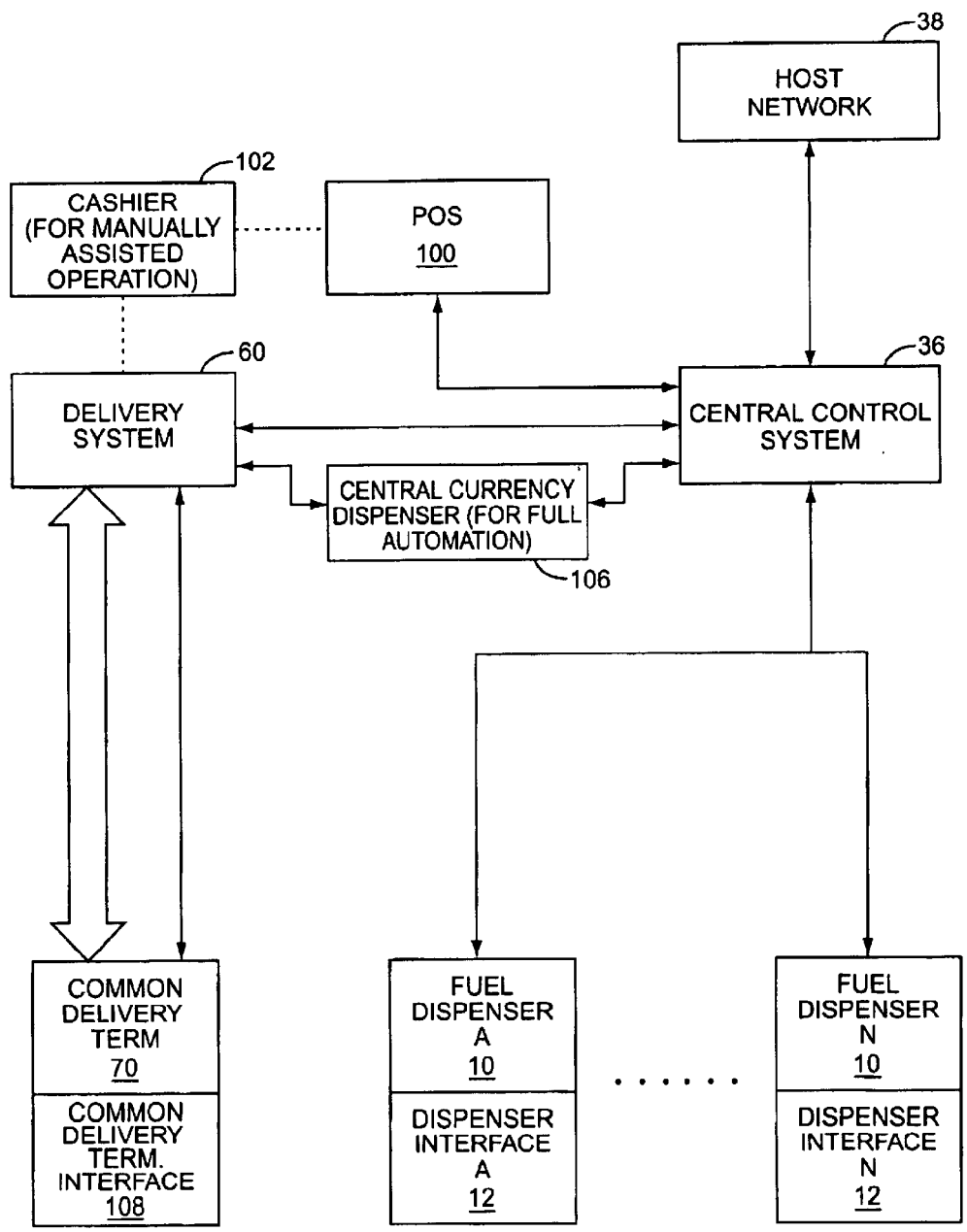
FIG. 12 is a block schematic of a system constructed according to the present invention having a delivery system for delivering cash to a common delivery terminal located in the forecourt.

FIG. 12 depicts a delivery system in a fueling environment wherein a common delivery terminal 70 is placed in the forecourt. The operation of the delivery system is analogous to the delivery embodiment discussed immediately above, yet requires verification of a customer at the common delivery terminal 70 before cash or products are made accessible or delivered to the customer. In a typical operation, the customer will supply account information to the fuel dispenser using a card, transponder or other medium storing financial information to authorize fueling. The fuel dispenser transfers financial information to the central control system 36, which will request authorization from the host network 38. Upon authorization, the customer will begin fueling and/or order products from an associated quick-serve restaurant or convenience store, or purchase a car wash. During this transaction, the customer may request cash back. The cash back request is accounted for either with the existing transactions or separately authorized by the central control system 36 and host network 38.

Once the transaction is over and the cash request is approved or authorized, the central control system 36 will query a cashier 102 to manually load the cash into the delivery system for delivery to the common delivery terminal or cause the central currency dispenser 106 to automatically load the requested amount of cash into the delivery system 60. The fuel dispenser then instructs the customer to move to the common delivery terminal 70 to receive the requested cash. In order to receive the cash, the customer must verify his or her identification in any number of ways, such as entering a PIN number or code, scanning indicia printed at the fuel dispenser for verification, entering a card into the card reader, or allowing a transponder to be interrogated by the interrogator 86. Any type of verification is acceptable and considered within the scope of the present invention.

Figure 13:
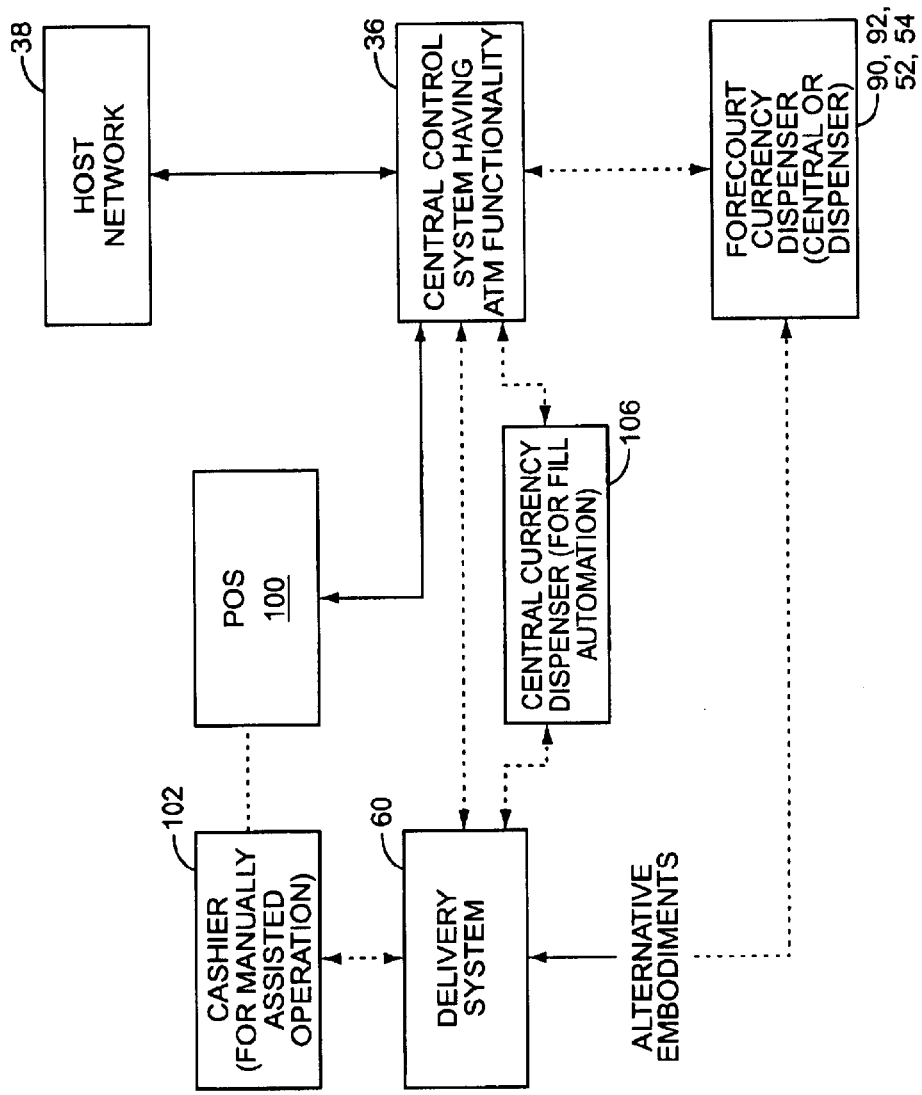
FIG. 13 is a block schematic wherein the central control system has automated teller functionality.
Figure 14:
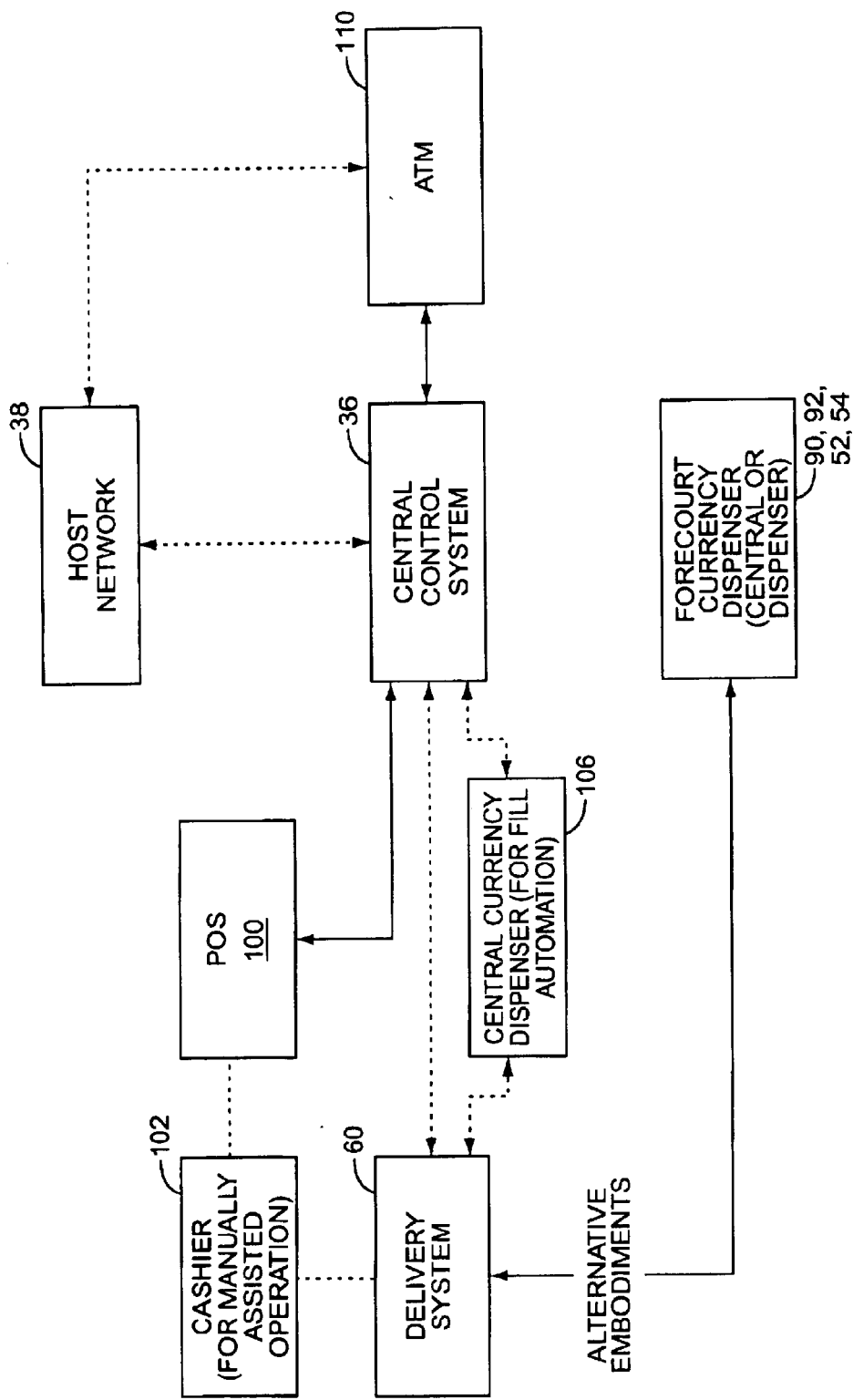
FIG. 14 is a block schematic wherein the central control system is associated with an automated teller machine.

As discussed above, in addition to providing cash back to the customer in association with the transaction, the dispenser and central control system may be configured to provide virtually any ATM function at the dispenser 10. Regardless of whether delivery systems are implemented in the fueling environment or currency dispensers are used at the dispensers or common terminals, the central control system 36 may be configured to provide ATM functionality in addition to the typical management of the fuel dispensers, convenience store, quick-serve restaurant, car washes, and other systems throughout the fueling environment. In essence, the central control system 36 acts as the heart of an ATM with a remote interface at the fuel dispensers or common terminals, as shown in FIG. 13. Alternatively, the central control system 36 may communicate directly with an ATM in the fueling environment. The ATM may access various host networks 38 directly or via the central control system 36. In the embodiment shown in FIG. 14, accounting and control of ATM functions are provided via the ATM wherein traditional transactions are carried out through the central control system 36 in cooperation with the host network 38.

Those of ordinary skill in the art will recognize from the teachings herein additional ways to provide cash back and ATM functionality in the fueling environment. Furthermore, the inventive aspects discussed above are equally applicable to electricity dispensers used to fuel electric vehicles. As is clear from the specification, any energy dispensing system will benefit from the improvements disclosed herein. Any such modifications are considered to be within the scope of the present invention and the claims that follow.

What is claimed is:

1. A fuel dispenser for providing cash to a customer in excess of transaction cost, said dispenser comprising:
   a fuel delivery system for delivering fuel to a vehicle;
   a customer interface including a financial information reader, display, and input device; and
   a control system adapted to con fuel delivery and said customer interface;
   said control system configured to:
   a) receive account information from the customer from said financial information reader for a fueling transaction;
   b) effect payment of the fueling transaction and a select cash amount payable to the customer in excess of said fueling transaction on an account; and
   c) authorize a select cash amount back payable to the customer;
   wherein the customer can request cash back in addition of to said fueling transaction at the dispenser during the fueling transaction.

2. The fuel dispenser of claim 1 wherein said financial information reader is a card reader.

3. The fuel dispenser of claim 1 wherein said financial information reader is a transponder interrogator configured to wirelessly receive the financial information from a transponder.

4. The fuel dispenser of claim 1 further comprising a cash dispenser controlled by said control system and configured to dispense the select cash amount to the customer.

5. The fuel dispenser of claim 1 further comprising a pneumatic delivery receptacle wherein said dispenser control system cooperates with a central delivery system to effect physical transport of the select cash amount to the delivery receptacle.

6. A dispensing system providing cash back to a customer comprising:
   at least one fuel dispenser for delivering fuel to a vehicle and having a customer interface for conducting a purchase transaction at the dispenser, allowing the customer to select a cash amount in addition to the purchase transaction, and obtaining financial information from an account necessary for the purchase transaction and authorizing payment of the cash amount to the customer; and
   a central control system associated with said at least one dispenser and configured to effect the a purchase transaction of the customer and to authorize received said purchase transaction and customer request for cash back via remote authorization network on said account.

7. The dispensing system of claim 6 further comprising a pneumatic delivery system having a central terminal for loading the select cash amount and a remote terminal at or near said at least one fuel dispenser wherein the select cash amount is delivered from the central terminal to the remote terminal upon authorization.

8. The dispensing system of claim 7 wherein said central terminal is adjacent a point-of-sale terminal associated with said central control system, said point-of-sale terminal configured to allow manual delivery of the select cash amount to the central terminal of the pneumatic delivery system.

9. The dispensing system of claim 7 wherein said central terminal is associated with a cash dispenser configured to place cash in said pneumatic delivery system for delivery to said remote terminal.

10. The dispensing system of claim 7 wherein one said remote terminal is located at each said at least one fuel dispenser.

11. The dispensing system of claim 7 including one said remote terminal in a location near multiple ones of said fuel dispensers wherein the remote terminal is a common terminal providing customers access to cash based on requests from any official fuel dispensers.

12. The dispensing system of claim 6 wherein said at least one fuel dispenser further includes a cash dispenser for dispensing the select cash amount to the customer.

13. The dispensing system of claim 6 wherein one cash dispenser is in a forecourt having multiple ones of said fuel dispensers, said cash dispenser is associated with said control system and configured to dispense said select cash amount after authorization by said central control system.

14. A fuel dispensing system comprising:
   a) a central control system associated with a financial authorization system; and
   b) a fuel dispenser having:
      i. means for receiving financial information sufficient to authorize payment for a transaction and provide cash back to a customer;
      ii. a customer interface; and
      iii. a dispenser control system configured to receive a select cash amount entered by a customer via said user interface and transfer the financial information to said central control system, which forwards the financial information, select cash amount, and transactional information to the financial authorization system for authorization of a select cash amount and transactional information for accounting.

15. The fuel dispensing system of claim 14 further comprising means to deliver the select cash amount to the customer in the forecourt of a service station containing said fuel dispenser after authorization of the select cash amount.

16. The fuel dispensing system of claim 15 wherein said means to deliver the select cash mount is a cash dispenser in said fuel dispenser.

17. The fuel dispensing system of claim 15 wherein said means to deliver the select cash mount is a stand-alone cash dispenser apart from said fuel dispenser.

18. The fuel dispensing system of claim 17 further comprising means for verifying a customer with a select cash amount at said cash dispenser, wherein a customer must provide verification to said means for verifying before said cash dispenser dispenses the select cash amount.

19. The fuel dispensing system of claim 15 wherein said means to deliver the select cash mount is a pneumatic cash delivery system comprising a pneumatic delivery tube connecting a central terminal and a remote terminal accessible by the customer, said delivery system having a delivery cartridge to carry the select cash amount from said central terminal to said remote terminal.

20. The fuel dispensing system of claim 19 wherein said remote terminal is located in or adjacent said fuel dispenser.

21. The fuel dispensing system of claim 19 wherein said remote terminal is located apart from said fuel dispenser and accessible by customers.

22. The fuel dispensing system of claim 21 further comprising means for verifying a customer with a select cash amount at said remote terminal, wherein a customer must provide verification to said means for verifying before giving access to said select cash amount in said remote terminal.

23. The fuel dispensing system of claim 22 wherein said means for verifying a customer with a select cash amount is a card reader and said control system transfers card information to said remote terminal for verification using card information obtained from the customer at the remote terminal.

24. An energy dispenser for providing cash to a customer in excess of transaction cost, said dispenser comprising:

an energy delivery system for delivering an energy source to a vehicle;

a customer interface including a financial information reader, display, and input device; and a control system adapted to control energy delivery and said customer interface;

said control system configured to:
  a) receive account information from the customer from said financial information reader for an energy transaction;
  b) effect payment of the energy transaction and a select cash amount payable to the customer in excess of said fueling transaction on an account; and
  c) authorize a select cash amount back payable to the customer;

wherein the customer can authorize cash back in excess of transactional costs at the dispenser during the energy delivery transaction.

* * * * *

UNITED STATES PATENT AND TRADEMARK OFFICE
CERTIFICATE OF CORRECTION

PATENT NO. : 6,766,949 B2
DATED : July 27, 2004
INVENTOR(S) : Steven N. Terranova and John S. McSpadden It is certified that error appears in the above-identified patent and that said Letters Patent is hereby corrected as shown below:

Column 9,
Line 38, "adapted to con fuel delivery" should be changed to -- adapted to control fuel delivery --.

Column 10,
Line 10, "to effect the a purchase" should be changed to -- to effect the purchase --.
Line 50, "and provide cash" should be changed to -- and providing cash --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,766,949 B2
DATED : July 27, 2004
INVENTOR(S) : Steven N. Terranova and John S. McSpadden It is certified that error appears in the above-identified patent and that said Letters Patent is hereby corrected as shown below:

Column 9,
Line 38, "adapted to con fuel delivery" should be changed to -- adapted to control fuel delivery --.

Column 10,
Line 10, "to effect the a purchase" should be changed to -- to effect the purchase --.
Line 50, "and provide cash" should be changed to -- and providing cash --.

Signed and Sealed this

Sixth Day of September, 2005

JON W. DUDAS
*Director of the United States Patent and Trademark Office*

Adverse Decision in Interference

Patent No. 6,766,949, Steven N. Terranova, John S. McSpadden, CASH BACK DURING DISPENSER TRANSACTION, Interference No. 105,397, final judgment adverse to the patentees rendered August 23, 2007, as to claims 1-24.

*(Official Gazette March 18, 2008)*